Jan. 28, 1936.  E. J. W. RAGSDALE  2,029,276
FLYING BOAT SUSPENSION STRUCTURE
Filed May 12, 1932  4 Sheets-Sheet 1
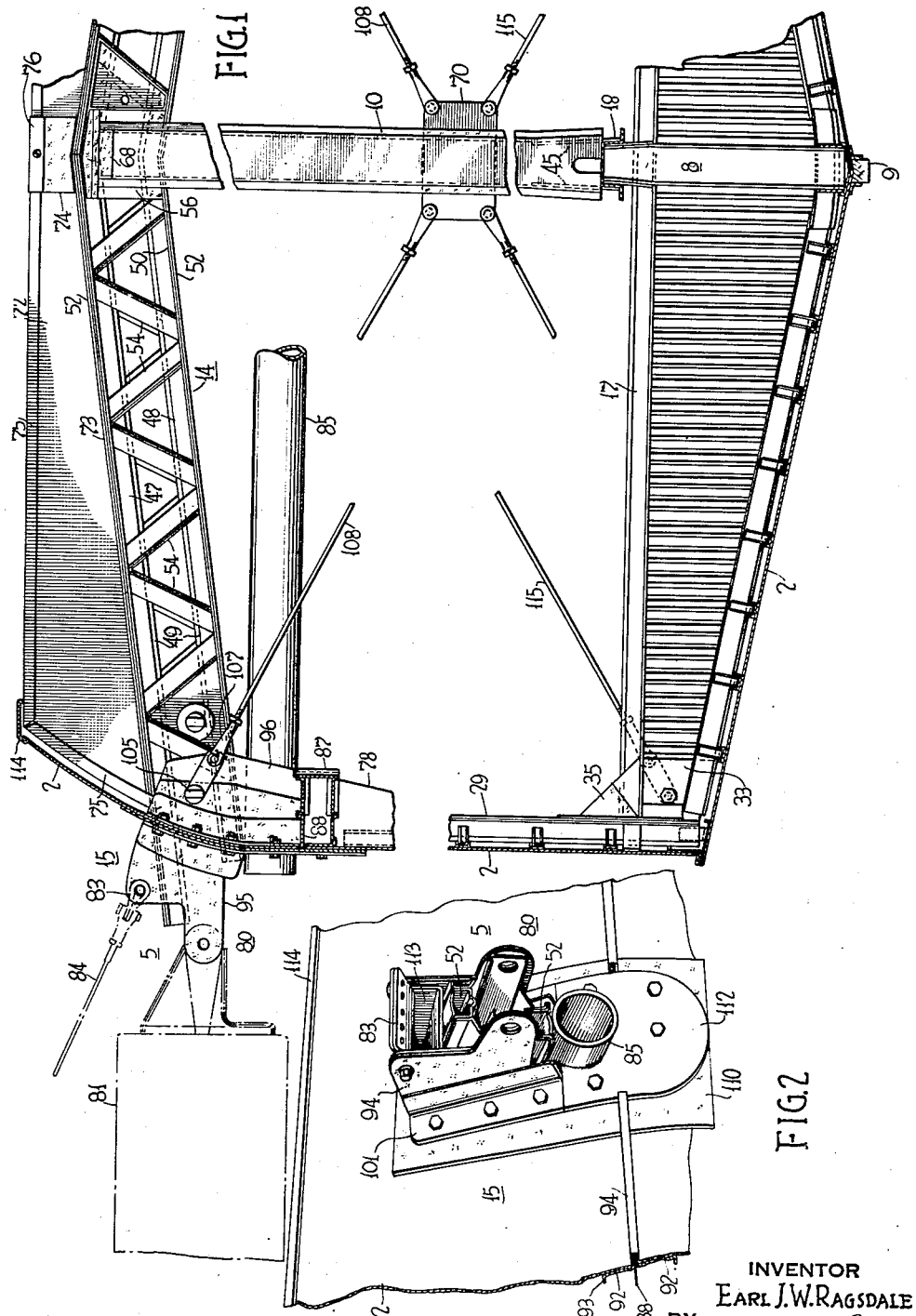
INVENTOR
EARL J.W.RAGSDALE
BY
John P. Tarbox
ATTORNEY Jan. 28, 1936.   E. J. W. RAGSDALE   2,029,276
FLYING BOAT SUSPENSION STRUCTURE
Filed May 12, 1932   4 Sheets-Sheet 2
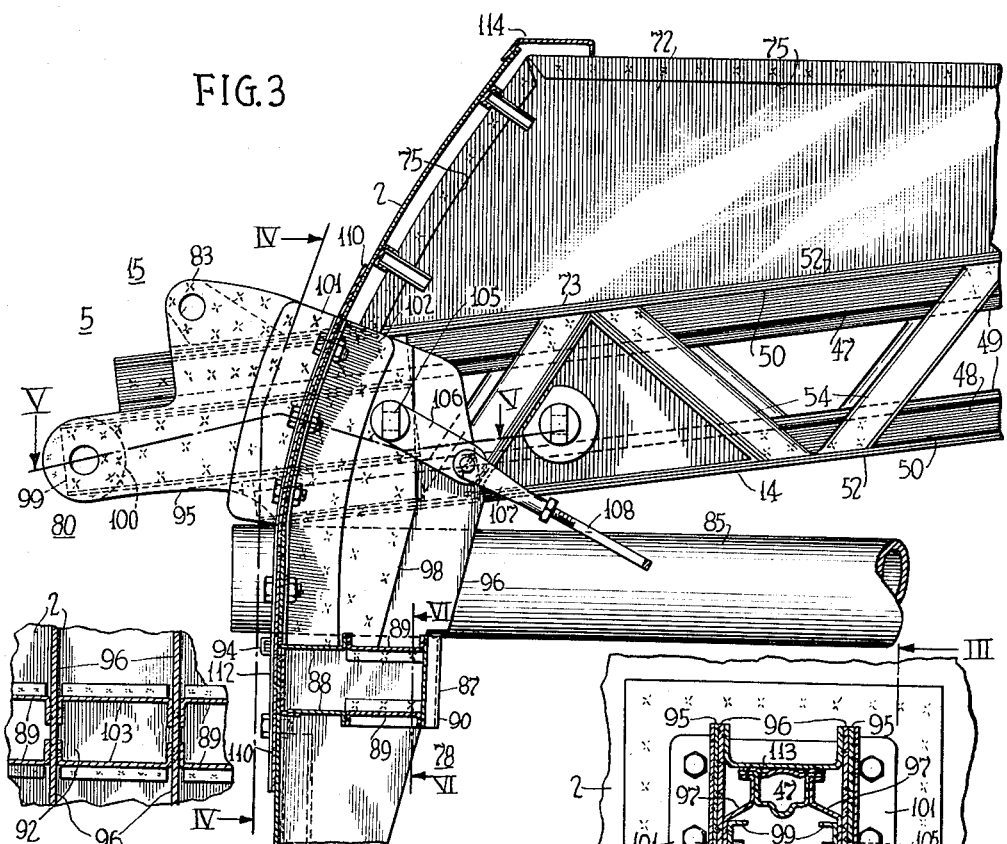
INVENTOR
Earl J. W. Ragsdale
BY
John P. Barbos
ATTORNEY Jan. 28, 1936. E. J. W. RAGSDALE 2,029,276
FLYING BOAT SUSPENSION STRUCTURE
Filed May 12, 1932 4 Sheets-Sheet 3
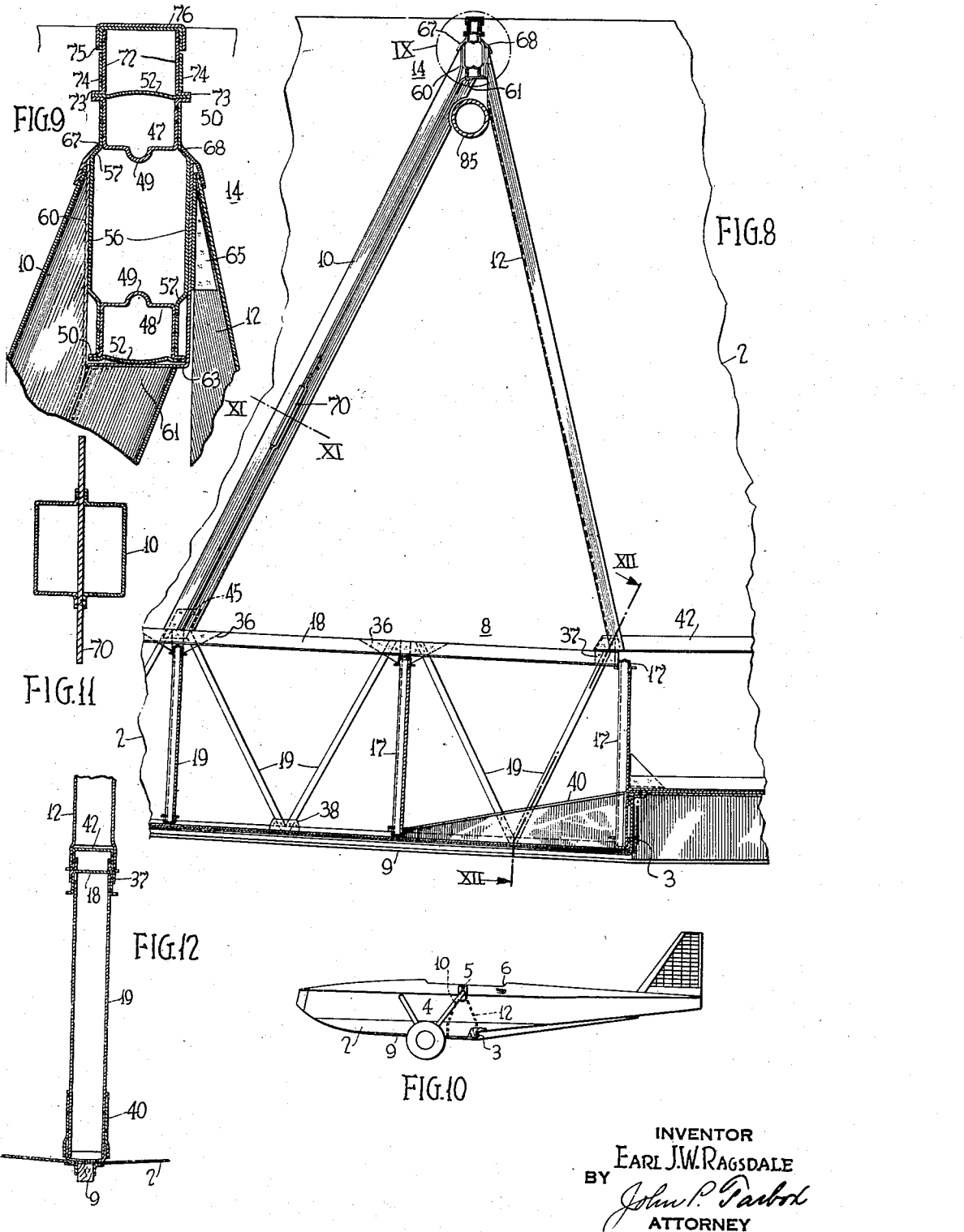
INVENTOR
EARL J.W. RAGSDALE
BY
John P. Tarbox
ATTORNEY

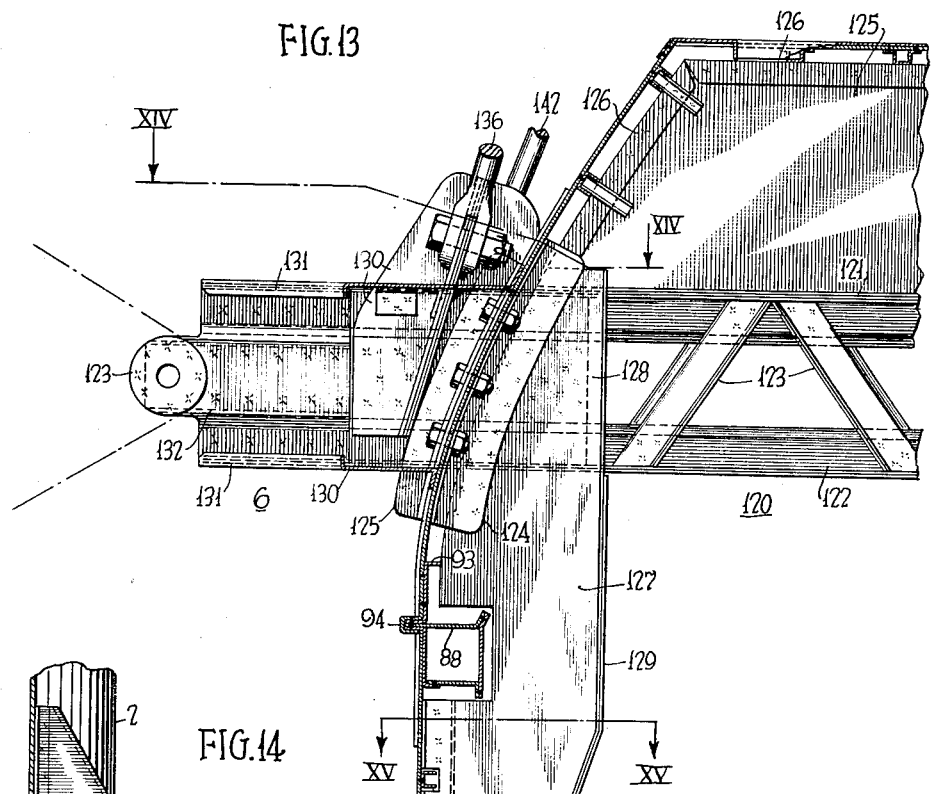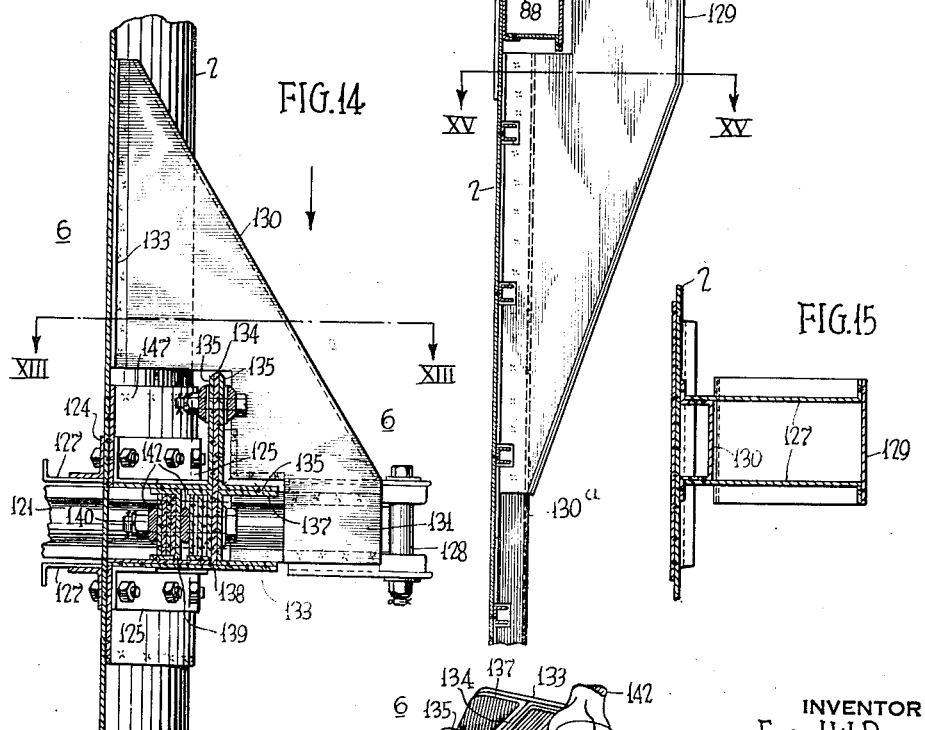

Patented Jan. 28, 1936

2,029,276

UNITED STATES PATENT OFFICE 2,029,276

FLYING BOAT SUSPENSION STRUCTURE

Earl J. W. Ragsdale, Norristown, Pa., assignor to Edward G. Budd Manufacturing Company, Philadelphia, Pa., a corporation of Pennsylvania Application May 12, 1932, Serial No. 610,782

7 Claims. (Cl. 244—2)

My invention relates to flying boats and particularly to internal frames or superstructures, and appurtenant parts, for suspending the boat hulls from the wings.

One object of my invention is to provide a flying-boat hull that shall be constructed substantially entirely of metal, that shall be of light weight, that shall facilitate spot welding of its parts and that shall symmetrically distribute the various forces that occur between the suspension points and points throughout the hull, incident to floating on the water, taking off, flying and alighting.

Another object of my invention is to provide a device, of the above-indicated character, that shall be of light weight, without sacrificing necessary strength, proof against the effects of moisture to which it is substantially constantly subjected, whether flying or at rest, relatively safe under all conditions, and relatively fire and shatter-proof. Another object of my invention is to construct the device with a view to providing adequate and comfortable space for the occupants and to obtain other advantages.

A further object of my invention is to provide a flying-boat hull structure that shall be simple and durable in construction, economical to manufacture and effective in its operation.

Outstanding features of the invention comprise a frame providing its major bracing effect between suspension points and points symmetrically distributed throughout the hull, transverse beams and suspension elements therein corresponding in positions to the positions of the wing spars to which the suspension elements are attached, a longitudinal bottom truss, a combined hull-mounting and guy-wire-attaching unit, an internal guy-wire structure, a relation between the suspension elements and certain bulkheads, internal and external braces for the suspension elements, a combined suspension and draft-rigring structure and other elements in combination and for the purposes of the invention, as will hereinafter appear.

Figure 1 of the accompanying drawings, is a view, partially in transverse section and partially in elevation, of a flying-boat body structure embodying my invention, the section being taken parallel, and adjacent to, the front spar of the wing to which the boat is attached, Fig. 2 is a detail perspective exterior view of a portion of the body, a portion of the means for suspending the same on the front spar of the wing, and a portion of the mounting means for the landing gear, Fig. 3 is an enlarged view of portions of the device shown in the upper left-hand area of Fig. 1, taken substantially along the line III—III of Fig. 4, Fig. 4 is a view, partially in side elevation and partially in section, of the structure shown in Fig. 2, taken substantially along the line IV—IV of Fig. 3, Fig. 5 is a view taken substantially along the line V—V of Fig. 3, Fig. 6 is a view taken substantially along the line VI—VI of Figs. 3 and 5, Fig. 7 is a view taken substantially along the line VII—VII of Fig. 5, Fig. 8 is a view, partially in side elevation and partially in longitudinal section, of a portion of the boat hull adjacent to a step-bottom portion thereof and near the front spar of the wing, Fig. 9 is an enlarged detail view of the parts shown in the broken-line circle IX of Fig. 8, Fig. 10 is a reduced-outline side-elevational exterior view of the boat body as a whole, Fig. 11 is an enlarged sectional view, taken along the line XI—XI of Fig. 8, Fig. 12 is a view, taken substantially along the line XII—XII of Fig. 8, Fig. 13 is a view, similar to Fig. 3, of a portion of the structure adjacent to the rear spar of the wing, to which it is attached, the view being taken substantially along a line XIII—XIII of Fig. 14, Fig. 14 is a view taken substantially along the line XIV—XIV of Fig. 13; this figure being reversed, from right-to-left, to that position which it should have on the sheet in relation to Fig. 13, Fig. 15 is a view taken substantially along the line XV—XV of Fig. 13, and Fig. 16 is a perspective view of portions of the device shown in Figs. 13 and 14.

Referring to the drawings, Fig. 10 represents, in side outline, a preferred general contour which a boat hull of my invention may have, and includes an outer sheathing 2, a bottom step 3, a retractable landing gear 4, a front suspension support 5 and a rear suspension support 6.

Figs. 1 to 9, inclusive, 11 and 12 all show parts more specifically related to the front suspension element 5, whereas Figs. 13, 14 and 15 show parts associated with the rear suspension element 6.

Referring to the figures of the front-supporting-parts, the device comprises, in general, a longitudinal center truss 8, see Figs. 1 and 8, that is mounted in a vertical plane over the keel 9 and extends forwardly from the step 3, diagonal front and rear beams 10 and 12, respectively, that extend from the truss 8 to a transverse upper beam 14, structures or units 15, see Figs. 1 to 5, inclusive one at each end of the beam 14 for suspending the hull, supporting the beam 14, bracing an adjacent associated wing, providing internal guy-wire terminals, reinforcing the sheathing 2, mounting the landing gear 4 and having other parts and functions.

The truss 8 includes bulkheads or transverse beams 17, one of which constitutes a backing for the step riser 3, a top beam 18 and diagonal braces 19.

The keel 9 is of wood, supported beneath a keelson of top-opening channel section, and the bottom wall of the sheathing 2, as by longitudinal members of L-section, shown at the bottom of Fig. 1.

Each bulkhead 17 comprises top and bottom edge-liners of channel section fitting the sides of a corrugated body portion, to the flat outer convolutions of which the edge liners are spot welded. Longitudinal stringers of top opening channel-section are spot welded to the bottom sheathing and supported by gussets therein of sloping-upright-side channel section spot welded to the sides of the channel stringers and to the sides of the bottom bulkhead edge liner.

Side uprights 29, at the bulkheads, are similarly of channel or box-section and secured to the side-wall sheathing by longitudinal side stringers of channel section. Gussets in the stringers, end plates 33 and corner gussets 35 adjacent thereto secure the bulkhead 17 and the uprights 29 to each other.

The top beam 18, of the truss 8, is of inverted substantially channel section facing the upright channel-section keelson for the reception therein of the diagonal braces 19 which are also, preferably of hollow section and secured in position to the beams, as by gussets 36, 37 and 38, and by a relatively large longitudinal brace 40 reinforcing the step riser 3 and extending between the first two bulkheads on the lower step adjacent to the riser; all of these parts being shaped and related for spot welding.

A beam 42, of hollow section and extending aft, in continuation of the beam 18 from the step bulkhead, is secured to the diagonal 12 and to the beam 18 by the gusset 37. The diagonal 10 is secured to the beam 18, as by a gusset or gussets 45.

The main transverse upper beam 14 comprises diagonally or V-related half sections meeting at the apex between the diagonals 10 and 12 and projecting transversely through side openings in the hull sheathing over the uprights 29. Each half section of the beam 14 comprises upper and lower elements 47 and 48 of box section embodying portions of channel section having reinforcing ribs 49 of channel section and transverse flanges 50 on which cover plates 52 are spot welded. Diagonals 54, similarly of box-section having transverse edges and reinforcing ribs, have the side walls thereof extended over the sides of the elements 47 and 48 and spot welded thereto.

At the intersection of the halves of the transverse beam 14, over the beams 10 and 12, side uprights 56 have main intermediate upright portions, at opposite sides of the beam, and inturned ends 57 spot welded to the sides of the elements 47 and 48, and extending oppositely for short distances along the beam halves from the intersection thereof.

The diagonal 10 is built-up of flanged channel halves spot welded together and has an upper substantially V-end between its halves, one arm 60 of which extends upwardly along, and is spot welded to, one of the uprights 56 of the beam 14, and the other arm 61 of which extends across the bottom of the beam 14. A reinforcing plate 63 of L-section, see Fig. 9, extends from the arm 61 of the diagonal 10 at the bottom of the beam 14, along the side of the beam 14 opposite to the arm 60 of the beam 10. The beam 12 is secured to the plate 63, as by a diagonal gusset 65, of channel section. Cover plates 67 and 68 are secured to the sides of the element 47 and extend downwardly and outwardly over the extreme upper ends of the beams 10 and 12; all of these parts being spot welded in flat-surface engagement. A guy-wire-securing plate 70, Fig. 1, is spot welded to the diagonal 10 at a position between the ends thereof.

Above the beam 14, parallel plates 72 have lower edge flanges 73 conforming to the sloping top edges of the beam, to which they are spot welded and are further secured, over the diagonals 10 and 12, by gussets 74. The plates 72 are connected across the top, and partially, down the sides, of the hull, by a cap member 75 of inverted channel section. A relatively short central cap member 76 of inverted channel section is secured over the member 75 above the diagonals. This structure has the effect of additionally strengthening the beams 14 and bracing them to the side walls.

The ends of the beam 14 project through openings in the side wall sheathing 2 over the uprights 29 at positions in which they are reinforced, braced and correlated by the unit structures 15, only one of which is shown.

This structure comprises, inside the hull, as viewed most clearly in Figs. 1 and 3, a composite upright diagonal brace 78 including members at opposite sides of the beam 14 and having parts at these sides projecting through the opening in the hull to the exterior thereof to provide substantially a clevis 80, constituting a main support between the boat and a wing 81, and to provide attaching means 83 for lift wires 84.

A tube 85, disposed beneath the beam 14 parallel thereto and extending through the openings in the hull between side members of the brace 78, constitutes a mounting for the running gear 4, as well as a substantial brace for the hull. A longitudinal brace or gusset 87, beneath the tube 85, intersects the upright diagonal brace 78 and extends oppositely therefrom along the hull. It comprises inner members 88 of L-section, triangular members 89 of channel section and a cap or cover plate 90, all having adjacent parallel-edge flanges spot welded to each other. As shown more clearly in Fig. 7, the members 88 are secured to longitudinal side stringers 92 of Z-section to provide a box-section beam, a flange 93 and a laminated edge structure over which a section 94 of the sheathing 2 is crimped.

The clevis 80, comprises a plurality of vertical-parallel-plane plates 95, 96, and 98, channel sections 99, uprights 97 between the beams 47 and 48, plates or washers 100, and exterior and interior gussets 101 and 102 of L-section.

The triangular members 89 abut the outer sides of the plates 96 and are braced between the plates 96 by members 103 similar to the members 89 and substantially constituting extensions thereof through plates 96, without breaking the latter.

As shown more clearly in Fig. 4, the uprights 97 fit the angles formed between the sides and transverse flanges of the beams 47 and 48 and have transversely extending mid sections of channel section in which the channel sections 99 are disposed. A tubular member 104 extends transversely to the channels 99 and has end flanges spot welded thereto. This tube receives an eye-pin 105 held in position, at the other end, by a nut. A link 106 is mounted on the pin 105 for the reception of the terminal 107 of a guy wire 108.

A plate or frame 110, on the outside surface of the sheathing 2 surrounds the structure 15 and extends oppositely therefrom, along the side of the hull, to positions under the crimp 94. A plate 112, in the plane of the sides of the L-section 101 on the sheathing 2, fits the adjacent ends of the crimp 94 and embraces the tube 85. A gusset 113, of sloping-side-wall channel section, is spot welded in position between the plates 96 over the transverse beam 14 and has apertured side walls reinforcing the attaching means 83 for the lift wire 84. A garnish rail 114 is secured to the sheathing 2 about the edges of the cockpit.

The guy wires 108 extending between bracing structure 15 and the plate 70, together with guy wires 115, extending between the bulkhead end plates 33 and the plate 70, provide light-weight lateral bracing between the side and center uprights, and to support the seat backs of the front compartments of the cockpit which is divided into four compartments by the beams 10, 12 and 14. That is, the beam 14 divides the cockpit into front and rear compartments and the beams 10 and 12 are in the longitudinal center plane dividing each of these compartments into right and left compartments, providing room for four occupants. The guy-wires 108 and 115 and the beam 10 are in a common plane defining the slope of the back rests of the front-compartment seats.

Referring to Figs. 13, 14 and 15, in which corresponding parts are designated by corresponding reference characters, the structure associated with the rear suspension element 6 of Fig. 10, comprises a transverse beam 120 similar to the front beam 14, except that it is horizontal or straight, instead of having inclined halves. It similarly comprises upper and lower elements 121 and 122, and diagonals 123. It similarly has parallel reinforcing edge plates 125 thereabove that are reinforced by cap members 126 of channel section.

A main upright brace 127 is of substantially box section, having ends 128 of its side walls embracing the sides of the beam 120 and a cover plate 129 conforming to vertical upper and sloping lower outer-edge flanges thereof. The side plates of this brace are spot welded to the sides of an upright 130a of channel section.

Upright elements 132 are similar to the upright elements 97 and extend between the beams 121 and 122 to which they are spot welded. They are provided with apertured ears reinforced by washer-like plates 123 and constituting substantially a clevis for attachment to a co-operating eye in the rear spar of the wing, as by a pin 128. Interior and exterior gussets 124 and 125 are disposed on the sheathing 2 and on a reinforcing plate 147, respectively.

Upper and lower gusset plates 130 have portions 131 spot welded to the outer ends of the beams 121 and 122, sloping-edge horizontal wall portions extending along the side of the hull, transverse flanges 133a spot welded to the sheathing 2, and cut-away forward inner corner portions embracing the support 6.

A vertical-plane plate 133, normal to the sheathing 2, is spot welded to the outer side of one of the uprights 132 and projects to a position above the beam 120. A plate 134, normal to the plate 133 along the side of the hull, is welded between angle plates 135 having sides parallel thereto to form a laminated eye for the reception of a strut clevis 136 and sides in parallel spaced relation to the plate 133.

Between the plates 133 and 135, at the side of the plate 134 farthest from the hull, a gusset 137 of channel section is disposed. At the other side of the plate 134, between the plates 133 and 135, there are two gussets 138 and 139 of channel section welded in position. In each of the gussets 138 and 139 there are a plurality of flat plates 140 welded together and to the gussets for reinforcing purposes. The outer group of plates 140, with the gusset 139, provide an eye for a strut clevis 142.

In the above described structure, the boat hull is attached to the wings at the ends of the spars, these positions thereby constituting, in effect local points, or points of local concentration where all the forces of lifting and landing, whether on land or water, are transferred from the wings to the hull or landing gear or vice versa. The structure provides attaching supports at these points to withstand all of the demand on them, with an adequate factor of safety and to, as nearly as possible, radiate or uniformly and symmetrically distribute, the forces throughout a wide area of the hull. To illustrate, when the boat descends to the water, the impact forces are concentrated at the suspension points, but no local point of the hull bottom or sides assumes an undue share of the transmitted forces; the impact forces at the suspension points being the sum total of many equal smaller component forces from widely-distributed points on the hull bottom and sides.

When landing on the ground, the forces are similarly absorbed by the running-gear tires and distributed, fore and aft, through the transverse beams, the side beams and correlated parts.

The structure is almost entirely of stainless sheet steel, thereby rendering it proof against deterioration from weather and water, proof against shattering or splintering, is fire proof and non-magnetic.

It is shaped and gauged to give substantially maximum strength and minimum weight, without the sacrifice of necessary strength, and arranged to permit the spot welding of its parts. This means that, to obtain the advantage of spot welding, the parts must not only be arranged with a view to strength and light weight but also, with a view to the accessibility thereto of the welding electrodes. All of these factors have been observed in the structure set forth.

Where added strength is necessary, as at local stress points, the structure is built up of layers of stainless sheet steel, rather than by heavier sections. This feature gives greater strength in proportion to the metal employed, prevents fracture or splintering, permits spot welding and has other advantages.

While I have shown and described a particular form of my invention, changes may be effected therein without departing from the spirit and scope thereof, as set forth in the appended claims.

What I claim is:

1. A flying-boat hull comprising a sheathing, a transverse beam including continuous top and bottom chords extending through the sheathing, and a unit fitting structure on the beam and braced to the sheathing fore and aft and vertically and having a portion outside the sheathing for mounting the hull and attaching a guy-wire thereto and a portion inside the sheathing for attaching a guy-wire thereto to brace it to the central portion of the hull.

2. A flying-boat hull comprising a frame including a transverse upper beam, a lower portion and a diagonal beam extending between said transverse beam and said lower portion and supporting the transverse beam at upright and bottom sides thereof.

3. A flying-boat hull comprising a frame including a transverse upper beam, a lower portion, a front diagonal beam between the transverse beam and said lower portion and supporting the transverse beam at upright and bottom sides thereof, and a rear diagonal beam between the transverse beam and said lower portion.

4. A flying-boat hull comprising a frame including a transverse beam including spaced upper and lower-edge members interconnected by webbing, a longitudinal truss in the bottom of the hull, and a diagonal beam extending between said longitudinal truss and the beam and constituting through an extension thereof an upright connecting brace between said upper and lower edge members.

5. A flying-boat hull comprising a sheet metal sheathing having an opening therein, and framing therefor including a transverse beam of fabricated sheet metal extending through said opening, a fitting of laminated sheet construction on the projecting end of said transverse beam and spot welded thereto and to each other, and means bracing said beam and fitting horizontally extending in a fore and aft direction and vertically to the sheathing and framing forming the side wall of the hull in the region around said opening.

6. A flying-boat hull comprising a sheet metal sheathing and a frame including a transverse beam fabricated of light gauge hollow section sheet metal parts and extending through an opening in the sheathing in the side of the hull, a laminated sheet metal unitary structure for suspending the hull secured by spot welding the hinge parts together interiorly to the end of said beam and braced by welding exteriorly in different directions from said opening to the side wall sheathing and the framing associated therewith.

7. A flying-boat hull comprising a transverse frame extending through the cock-pit area and dividing said area in fore and aft portions, said frame forming an inclined structure transversely of the cock-pit to serve as a backing for the front seats, and comprising upper and lower transverse beams, an inclined brace extending between the central portions of said transverse beams and dividing the cockpit area into right and left seating areas, and tension means bracing the ends of said transverse beams to an intermediate portion of said inclined brace.

EARL J. W. RAGSDALE.